United States Patent Office 3,580,909
Patented May 25, 1971

3,580,909
4-STYRYLPYRIDINES
Hanns Hanina Lehr, Montclair, N.J., assignor to
Hoffmann-La Roche, Inc., Nutley, N.J.
No Drawing. Filed Dec. 9, 1968, Ser. No. 782,412
Int. Cl. C07d 31/20, 31/24
U.S. Cl. 260—240                                    12 Claims

ABSTRACT OF THE DISCLOSURE 4-styrylpyridines, prepared by reacting appropriately substituted pyridines and aromatic aldehydes, are described. The end products are useful as anticonvulsants.

BRIEF SUMMARY OF THE INVENTION

The invention relates to 4-styrylpyridines of the formula

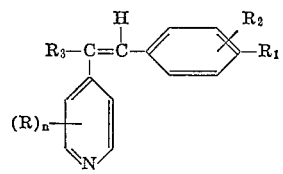

wherein R is hydrogen or alkyl; $R_1$ is halogen, sulfamoyl, alkanoylsulfamoyl, nitro, amino, alkylamino, dialkylamino, alkanoylamido or benzoylamido; $R_2$ is hydrogen or halogen; $R_3$ is hydrogen or alkyl, provided that when R and $R_3$ are hydrogen or when R is hydrogen and $R_3$ is methyl, $R_1$ and $R_2$ are other than nitro or chloro; and $n$ is 1 to 2, and their pharmaceutically acceptable acid addition salts. The end products are useful as anticonvulsant agents.

DETAILED DESCRIPTION OF THE INVENTION

The invention relates to compounds of the formula

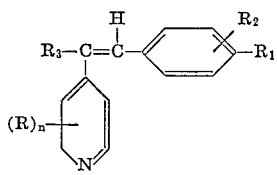

wherein R is hydrogen or lower alkyl; $R_1$ is halogen, sulfamoyl, lower alkanoylsulfamoyl, nitro, amino, lower alkylamino, lower alkanoylamido or benzoylamido; $R_2$ is hydrogen or halogen; $R_3$ is hydrogen or alkyl, provided that when R and $R_3$ are hydrogen or when R is hydrogen and $R_3$ is methyl, $R_1$ and $R_2$ are other than nitro or chloro; and $n$ is 1 to 2, and their pharmaceutically acceptable acid addition salts.
In its preferred aspect, the invention relates to compounds of the formula

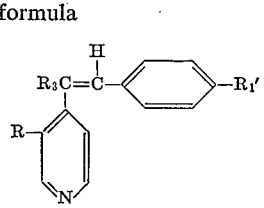

wherein R is hydrogen or lower alkyl; $R_1$ is halogen, sulfamoyl or lower alkanoylsulfamoyl; $R_3$ is hydrogen or lower alkyl, provided that when R is hydrogen, $R_1'$ is other than chloro, and their pharmaceutically acceptable acid addition salts.

Exemplary of the products of Formula I are the following compounds:

4-[β-(4-pyridyl)vinyl]benzenesulfonamide;
N-acetyl-4-[2-(4-pyridyl)vinyl]benzenesulfonamide;
4-[2-(2-methyl-4-pyridyl)vinyl]benzenesulfonamide;
4-[β-(3-methyl-4-pyridyl)vinyl]benzenesulfonamide;
4-[β-(3-ethyl-4-pyridyl)vinyl]benzenesulfonamide;
4-[2-(2,6-dimethyl-4-pyridyl)vinyl]benzenesulfonamide;
4-[2-(4-pyridyl)propenyl]benzenesulfonamide;
4-[2-(4-pyridyl)-1-buten-1-yl]benzenesulfonamide;
4-(4-bromostyryl)pyridine;
4-(4-fluorostyryl)pyridine;
4-(4-benzyloxystyryl)pyridine;
4-(4-acetamidostyryl)pyridine;
2-methyl-4-(4-nitrostyryl)pyridine;
3-methyl-4-(4-nitrostyryl)pyridine;
4-(p-chlorostyryl)-3-methylpyridine;
4-(4-acetamidostyryl)-3-methylpyridine;
4-(4-chlorostyryl)-3-ethylpyridine;
3-ethyl-4-(4-nitrostyryl)pyridine;
3-ethyl-4-styrylpyridine;
4-[α-(p-bromobenzylidene)ethyl]pyridine;
4-[α-(p-acetamidobenzylidene)ethyl]pyridine;
4-[α-(p-aminobenzylidene)ethyl]pyridine;
4-[α-(4-propionamidobenzylidene)ethyl]pyridine;
4-[α-(4-benzamidobenzylidene)ethyl]pyridine;
4-[α-(p-acetamiodbenzylidene)ethyl]-3-methylpyridine;
4-(1-benzylidenepropyl)pyridine;
4-[α-(p-chlorobenzylidene)propyl]pyridine;
4-[1-(p-nitrobenzylidene)propyl]pyridine;
1-(1-naphthyl)-2-(4-pyridyl)ethylene;
1-(3-methyl-4-pyridyl)-2-(1-naphthyl)ethylene;

and the like. Of these, the following are more preferred:

4-[β-(4-pyridyl)vinyl]benzenesulfonamide;
4-[2-(4-pyridyl)propenyl]benzenesulfonamide;
4-[2-(4-pyridyl)-1-buten-1-yl]benzenesulfonamide;

and most preferred is 4-(p-chlorostyryl)-2-methylpyridine.

As used herein, the term "lower alkyl" denotes a straight or branched chain hydrocarbon group containing 1–7 carbon atoms, for example, methyl, ethyl, propyl, isopropyl, butyl, tertiary butyl and the like; preferred is methyl. The term "halogen" denotes all of the halogens, that is, bromine, chlorine, fluorine and iodine; preferred is chlorine. The term "lower alkanoyl" denotes a saturated aliphatic acyl group of 1–7 carbon atoms, for example, formyl, acetyl, propionyl, butyryl and the like.

The compounds of Formula I are prepared by reacting a pyridine of the formula

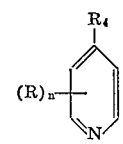

wherein R and $n$ are as previously described and $R_4$ is lower alkyl with an aromatic aldehyde of the formula

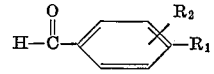

wherein $R_1$ and $R_2$ are as previously described.

The starting materials of Formula II are known compounds or are analogs of known compounds readily obtained by known procedures and are exemplified by 4-picoline, 2,4-lutidine, 3,4-lutidine, 3-ethyl-4-methylpyridine, 2,4,6-collidine, 4-ethylpyridine or the like.

The starting materials of Formula III are known compounds or are analogs of known compounds readily obtained by known procedures and are exemplified by p-sulfamoylbenzaldehyde, p-bromobenzaldehyde, p-fluorobenzaldehyde, p-benzyloxybenzaldehyde, p-acetaminobenzaldehyde, p-nitrobenzaldehyde, p-chlorobenzaldehyde, 1-naphthaldehyde or the like.

The reaction of the pyridines of Formula II with the aromatic aldehydes of Formula III to yield the useful end products of Formula I can be conducted in a manner known to the art. Preferably, it is conducted in the presence of a catalytic agent, such as, for example, concentrated hydrochloric acid, p-toluenesulfonic acid, acetic anhydride or the like, at an elevated temperature, preferably at the reflux temperature of the reaction mixture. After the reaction is completed, the desired end products of Formula I may be recovered by conventional procedures such as filtration and the like, and, if desired, purified by, for example, recrystallization.

The compounds of Formula I exhibit anticonvulsant activity and are, therefore, useful as anticonvulsant agents. Particularly pronounced is the anticonvulsant activity of 4-[β-(4-pyridyl)vinyl]benzenesulfonamide and 4-(p-chlorostyryl)-3-methylpyridine. Their useful anticonvulsant activity can be demonstrated in warm-blooded animals, such as mice, utilizing standard procedures, such as, for example, the Maximal Electroshock Assay. When 30 ma. of current (app. six times threshold) is delivered to mice for 0.2 second through corneal electrodes, a maximal tonic-clonic seizure is induced. The components of the maximal seizure in mice are: the hind leg flexor component of the tonic phase, and a phase of body clonus. Mice are screened 24 hours prior to an assay to make sure that they respond normally. In the general screen, a compound is administered orally to groups of four mice at various dose levels. One hour after administration of drug, the 30 ma. shock is applied. Disappearance of the hind leg extensor component is the criterion of activity. When activity is observed, the compound is administered to additional groups of mice until the extensor phase reappears. The dose in mg./kg. which prevents hind limb extension in two of four animals is reported as the effective dose 50 percent, i.e., $ED_{50}$ mg./kg. On active compounds, 8 animals are employed per dose group.

When 4-[β-(4-pyridyl)vinyl]benzenesulfonamide, which hras demonstrated in mice an $LD_{50}$ of, for example, 4200 mg./kg. p.o., 1850 mg./kg. i.p. and 7400 mg./kg. s.c., is utilized as the test substance, it exhibits an $ED_{50}$ of 30.2.

When 4-[2-(4-pyridyl)propenyl]benzenesulfonamide, which has demonstrated in mice an $LD_{50}$ of, for example, 710 mg./kg. p.o., 275 mg./kg. i.p. and >400 mg./kg. s.c., is utilized as the test substance, it exhibits an $ED_{50}$ of 9.32.

The compounds of Formula I form acid addition salts and such salts are also within the scope of the invention. The compounds of Formula I form pharmaceutically acceptable acid addition salts with both pharmaceutically acceptable organic and inorganic acids. Suitable organic acids are, for example, maleic acid, fumaric acid, tartaric acid, salicyclic acid, succinic acid, citric acid and the like. Suitable inorganic acids are, for example, the hydrohalic acids, e.g., hydrochloric acid and hydrobromic acid, sulfuric acid, phosphoric acid and the like. The acid addition salts are readily obtained by the usual techniques for the preparation of salts from acids.

The compounds of Formula I of the present invention and their pharmaceutically acceptable acid addition salts can be formulated, using conventional inert pharmaceutical adjuvant materials, into dosage forms which are suitable for oral or parenteral administration. Such dosage forms include tablets, suspensions, solutions, etc. Furthermore, the compounds of this invention can be embodied into, and administered in the form of, suitable hard or soft capsules. The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, talc, vegetable oils, gums, polyalkylene glycols, etc. Moreover, preservatives, stabilizers, wetting agents, emulsifying agents, salts for altering osmotic pressure, buffers, etc., can be incorporated, if desired, into such formulations.

The compounds of the Formula I and their pharmaceutically acceptable acid addition salts have effects qualitatively similar to those of diphenylhydantoin, known for its therapeutic use and properties. Thus, the compounds of the Formula I demonstrate a pattern of activity associated with anticonvulsants of known efficacy and safety.

The percentate of active ingredient in the compositions of the invention may be varied, it being necessary that it should constitute a proportion such that a suitable dosage for the therapeutic effect desired in the species of animal shall be obtained. Obviously, several unit dosage forms may be administered at about the same time.

The following non-limiting examples further illustrate the invention. All parts are by weight and all temperatures are in degrees centigrade, unless otherwise mentioned.

Example 1.—Preparation of 4-[β-(4-pyridyl)vinyl]benzenesulfonamide 8 g. p-sulfamoylbenzaldehyde, 4 g. 4-picoline and 1 ml. concentrated HCl were refluxed for 12 hours. The resulting cake was treated with methanol, the residue was removed by filtration and dried. After two recrystallizations from methanol-water, 4-[β-(4-pyridyl)vinyl]benzenesulfonamide was obtained as crystals having a melting point of 242°–243°.

From the mother liquors, on concentration, white crystals of 4-[β-(4-pyridyl)vinyl]benzenesulfonamide hydrochloride were obtained which after recrystallization from dilute HCl (1:3) had a melting point of 297°–298° (dec.).

Example 2.—Preparation of N-acetyl-4-[2-(4-pyridyl)vinyl]benzenesulfonamide 5 g. 4-[β-(4-pyridyl)vinyl]benzenesulfonamide was refluxed in 50 ml. acetic anhydride for 2 hours. After about 15 minutes crystallization set in. After cooling, the crystals were collected by filtration and recrystallized from dimethylformamide-water to yield N-acetyl-4-[2-(4-pyridyl)vinyl]benzenesulfonamide having a melting point of 259°–261°.

Example 3.—Preparation of 4-[2-(2-methyl-4-pyridyl)vinyl]benzenesulfonamide hydrochloride 8 g. p-sulfamoylbenzaldehyde, 30 ml. 2,4-lutidine and 400 mg. p-toluenesulfonic acid were refluxed 64 hours. The cooled mixture was poured into 250 ml. dilute HCl (1:3). The residue was removed by filtration, recrystallized from dilute HCl and then from dimethylformamide-HCl to yield 4-[2-(2-methyl-4-pyridyl)vinyl]benzenesulfonamide HCl having a melting point of 306°–308° (dec.).

Example 4.—Preparation of 4-[β-(3-methyl-4-pyridyl)vinyl]benzenesulfonamide hydrochloride 4.1 g. p-sulfamoylbenzaldehyde, 2.3 g. 3,4-lutidine and 1 ml. concentrated HCl were refluxed for 24 hours. After cooling, the cake was treated with ethanol. The residual solids were removed by filtration and recrystallized from a mixture of dimethylformamide-water. The crystals, having a melting point of 181°–182°, represented the free base 4-[β-(3-methyl-4-pyridyl)vinyl]benzenesulfonamide.

From the mother liquors, the corresponding hydrochloride was obtained which after recrystallization from dimethylformamide-dilute HCl has a melting point of 280°–282° (dec.).

Example 5.—Preparation of 4-[β-(3-ethyl-4-pyridyl)vinyl]benzenesulfonamide hydrochloride 4.5 g. p-sulfamoylbenzaldehyde, 2.9 g. 3-ethyl-4-methylpyridine and 1 ml. concentrated HCl were refluxed for 7 hours. The cooled mixture was taken up in ethanol, the residual solids were removed by filtration, washed with ethanol and dried. After recrystallization from dilute HCl (1:9) the crystals of 4-[β-(3-ethyl-4-pyridyl)vinyl]benzenesulfonamide hydrochloride had a melting point of 300°–302° (dec.).

Example 6.—Preparation of 4-[2-(2,6-dimethyl-4-pyridyl)vinyl]benzenesulfonamide hydrochloride 3.7 g. p-sulfamoylbenzaldehyde, 15 ml. 2,4,6-collidine and 1 ml. concentrated HCl were refluxed for 18 hours. The residual solids were removed by filtration and recrystallized from dilute HCl (1:9) to yield 4-[2-(2,6-dimethyl-4-pyridyl)vinyl]benzenesulfonamide hydrochloride having a melting point of >325°.

Example 7.—Preparation of 4-[2-(4-pyridyl)propenyl]benzenesulfonamide hydrochloride 4.5 g. p-sulfamoylbenzaldehyde, 2.6 g. 4-ethylpyridine and 1 ml. concentrated HCl were refluxed for 48 hours. The viscous mixture which formed was treated with ethanol, the residual solids were removed by filtration and recrystallized from dilute HCl (1:9) to yield 4-[2-(4-pyridyl)propenyl]benzenesulfonamide hydrochloride having a melting point of 257°–259° (dec.).

The free base, 4-[2-(4-pyridyl)propenyl]benzenesulfonamide, was prepared in the usual manner and had a melting point of 186°–188° (from dimethylformamide-water).

Example 8.—Preparation of 4-[2-(4-pyridyl)-1-buten-1-yl]benzene sulfonamide hydrochloride 4.5 g. p-sulfamoylbenzaldehyde, 2.7 g. 4-propylpyridine and 200 mg. p-toluenesulfonic acid were heated in an oil-bath at 160° for 48 hours. The mixture was taken up in ethanol and filtered. To the filtrate was added ethanolic HCl followed by the addition of ether in portions. The precipitated solids were removed by filtration and recrystallized from methanol-ether to yield 4-[2-(4-pyridyl)-1-buten-1-yl]benzenesulfonamide hydrochloride having a melting point of 249°–251° (dec.).

Example 9.—Preparation of 4-(4-bromostyryl)pyridine hydrochloride 9.2 g. p-bromobenzaldehyde, 9.2 g. 4-picoline and 2.5 ml. acetic anhydride were heated at 150° for 40 hours. The cooled mixture was added to 400 ml. water. The solids were collected by filtration, air dried and dissolved in ethanolic HCl. Excess ether was added, the precipitated solids were removed by filtration and recrystallized from ethanol-ether to yield 4-(4-bromostyryl)pyridine hydrochloride having a melting point of 244°–246°.

Example 10.—Preparation of 4-(4-fluorostyryl)pyridine 10 g. p-fluorobenzaldehyde, 7.5 g. 4-picoline and 4.5 ml. acetic anhydride were heated at 155° for 40 hours. The cooled mixture was added to 800 ml. water, the precipitated solids were removed by filtration, washed and air-dried. They were then dissolved in 800 ml. methylene chloride and chromatographed over 400 g. neutral Woelm alumina. The solids obtained from the chloroform eluate were recrystallized from heptane to yield 4-(4-fluorostyryl)pyridine, melting point 114°–116°.

Example 11.—Preparation of 4-(4-benzyloxystyryl)pyridine hydrochloride 21.2 g. p-benzyloxybenzaldehyde, 9.3 g. 4-picoline and 5 ml. acetic anhydride were heated at 155° for 40 hours. The cooled mixture was added to 800 ml. water. The solids were removed by filtration, washed, dried and recrystallized from dilute ethanol to yield 4-(4-benzyloxystyryl)pyridine hydrochloride, having a melting point of 260°–262°.

Example 12.—Preparation of 4-(4-acetamidostyryl)pyridine hydrochloride 16.3 g. p-acetaminobenzaldehyde, 9.3 g. 4-picoline and 5 ml. acetic anhydride were heated at 155° for 22 hours. The cooled mixture was added to 800 ml. water. The solids were removed by filtration and recrystallized from ethanol-water to yield 4-(4-acetaminostyryl)pyridine having a melting point of 212°–214°. The crystals were redissolved in ethanol, ethanolic HCl and excess ether were added. The precipitated solids were removed by filtration and recrystallized from dilute HCl (1:9) to yield 4-(4-acetaminostyryl)pyridine hydrochloride having a melting point of >30°.

Example 13.—Preparation of 2-methyl-4-(4-nitrostyryl)pyridine hydrochloride 7.5 g. p-nitrobenzaldehyde, 30 ml. 2,4-lutidine and 5 ml. acetic anhydride were heated at 160° for 40 hours. The cooled mixture was added to 1 liter dilute HCl (1:3). The filtered solution was made alkaline with 20 percent sodium hydroxide and the precipitated solids were collected by filtration. They were converted to the hydrochloride in the usual manner to yield 2-methyl-4-(4-nitrostyryl)pyridine hydrochloride having a melting point of 218–220° (dec.).

Example 14.—Preparation of 3-methyl-4-(4-nitrostyryl)pyridine hydrochloride 15.1 g. p-nitrobenzaldehyde, 10.7 g. 3,4-lutidine and 5 ml. acetic anhydride were heated at 160° for 28 hours. The cooled mixture was added to 600 ml. water, the solids were removed by filtration, air-dried and dissolved in ethanol. To the solution was added ethanolic HCl and excess ether. The precipitated solids were removed by filtration and recrystallized from dilute HCl (1:9) to yield 3-methyl-4-(4-nitrostyryl)pyridine hydrochloride having a melting point of 272°–274°.

Example 15.—Preparation of 4-(p-chlorostyryl)-3-methylpyridine hydrochloride 14 g. p-chlorobenzaldehyde, 10.7 g. 3,4-lutidine and 5 ml. acetic anhydride were heated at 160° for 40 hours. The cooled mixture was added to 600 ml. water. The solution was made alkaline with 10 percent sodium hydroxide and the precipitated solids were collected by filtration, washed and air-dried. They were dissolved in ethanol and to the solution were added ethanolic HCl and excess ether. The precipitated solids were removed by filtration and recrystallized from ethanol-ether to yield 4-(p-chlorostyryl)-3-methylpyridine hydrochloride having a melting point of 271°–273° (dec.).

Example 16.—Preparation of 4-(4-acetamidostyryl)-3-methylpyridine 16.3 g. p-acetaminobenzaldehyde, 10.7 g. 3,4-lutidine and 5 ml. acetic anhydride were heated to 150–160° for 40 hours. The cooled mixture was added to 600 ml. of water. The precipitated solids were collected by filtration and recrystallized from ethanol, then from acetonitrile to yield 4-(4-acetaminostyryl)-3-methylpyridine having a melting point of 135°–138°.

Example 17.—Preparation of 4-(4-chlorostyryl)-3-ethylpyridine hydrochloride 14 g. p-chlorobenzaldehyde, 12.1 g. 3-ethyl-4-methylpyridine and 5 ml. acetic anhydride were heated at 150–160° for 40 hours. The cooled mixture was added to 600 ml. water, made alkaline and extracted with methylene chloride. After removal of the solvent, the residue was converted to the hydrochloride in the usual manner. After recrystallization from ethanolether and then from isopropanol, the crystals of 4-(4-chlorostyryl)-3-ethylpyridine hydrochloride had a melting point of 258°–260° (dec.).

Example 18.—Preparation of 3 - ethyl 4(4 - nitrostyryl)pyridine hydrochloride 15.1 g. p-nitrobenzaldehyde, 12.1 g. 3-ethyl-4-methylpyridine and 5 ml. acetic anhydride were heated at 150–160° for 40 hours. The cooled mixture was added to 600 ml. water. The precipitated solids were collected by filtration and recrystallized from dilute HCl to yield 3-ethyl-4-(4-nitrostyryl)pyridine hydrochloride having a melting point of 273°–275°.

Example 19.—Preparation of 3-ethyl-4-styrylpyridine hydrochloride 10.6 g. benzaldehyde, 12.1 g. 3-ethyl-4-methylpyridine and 5 ml. acetic anhydride were heated at 150°–160° for 40 hours. The cooled mixture was added to 500 ml. water and the neutralized solution was extracted with methylene chloride. After removal of the solvent, the residue was converted to the hydrochloride in the usual manner and recrystallized from isopropanol to yield 3-ethyl-4-styrylpyridine hydrochloride having a melting point of 228°–230° (dec.).

Example 20.—Preparation of 4-[α-(p-bromobenzylidene)ethyl]pyridine hydrochloride 9.2 g. p-bromobenzaldehyde, 5.3 g. 4-ethylpyridine and 2.5 ml. acetic anhydride were heated at 160° for 40 hours. The cooled mixture was added to 600 ml. water. The precipitated solids were converted to the hydrochloride in the usual manner and recrystallized from isopropanol to yield 4[α - (p-bromobenzylidene)ethyl]pyridine hydrochloride having a melting point of 232°–234° (dec.).

Example 21.—Preparation of 4-[α-(p-acetamidobenzylidene)ethyl]pyridine hydrochloride 8.1 g. p-acetaminobenzaldehyde, 5.3 g. 4-ethylpyridine and 2.5 g. acetic anhydride were heated at 160° for 40 hours. The cooled mixture was added to 600 ml. water and the precipitated solids were collected by filtration, washed and air-dried. They were dissolved in ethanolic HCl and excess ether was added. The solids were removed by filtration and recrystallized from dilute HCl to yield 4-[α-(p - acetamidobenzylidene)ethyl]pyridine hydrochloride having a melting point of >305°.

The hydrochloride was converted in the usual manner to the corresponding 4-[α-(p-acetamidobenzylidene)ethyl]pyridine having a melting point of 177–179° (from acetonitrile).

Example 22.—Preparation of 4[α-(p-aminobenzylidene)ethyl]pyridine 5 g. 4-[α-(p-acetamidobenzylidene)ethyl]pyridine were dissolved in 100 ml. 3 N HCl and refluxed for 40 hours. The cooled solution was made alkaline. The precipitated solids were removed by filtration and recrystallized from acetonitrile-water to yield 4-[α-(p-aminobenzylidene)ethyl]pyridine having a melting point of 170°–172°.

Example 23.—Preparation of 4-[α-(4-propionamidobenzylidene)ethyl]pyridine 15 g. 4-[α-(p-acetamidobenzylidene)ethyl]pyridine were dissolved in 150 ml. 70 percent $H_2SO_4$ and heated 1 hour at 140°. The solution was poured into a mixture of 800 ml. of water and 400 ml. 40 percent sodium hydroxide. The precipitated solids were removed by filtration, dissolved in 30 ml. propionic anhydride and refluxed overnight. The cooled mixture was added to 800 ml. of water containing 25 ml. 40 percent sodium hydroxide. The supernatant liquid was decanted and the residue taken up in benzene. Addition of hexane precipitated crystals which were recrystallized from benzene to yield 4-[α-(4-propionamidobenzylidene)ethyl]pyridine having a melting point of 178°–180°.

Example 24.—Preparation of 4-[α-(4-benzamidobenzylidene)ethyl]pyridine 1.9 g. 4-[α-(p-aminobenzylidene)ethyl]pyridine were dissolved in 50 ml. benzene. 1.4 g. benzoyl chloride were added and the mixture was heated on the water bath for 10 minutes. The solids were removed by filtration, slurried in 1 N NaOH, refiltered, washed with water and dried. After recrystallization from ethanol, the crystals of 4-[α-(4-benzamidobenzylidene)ethyl]pyridine had a melting point of 186°–188°.

Example 25.—Preparation of 4-[α-(p-acetmidobenzylidene)ethyl]-3-methylpyridine hydrochloride 16.3 g. p-acetaminobenzaldehyde, 12.1 g. 3-methyl-4-ethyl-pyridine and 5 ml. acetic anhydride were heated at 150° for 72 hours. The cooled mixture was added to 800 ml. water, and the mixture extracted with methylene chloride. After removal of the solvent, the residue was converted to the hydrochloride in the usual manner. After recrystallization from methanol-ether, 4-[α-(p-acetamidobenzylidene)ethyl]-3-methylpyridine hydrochloride had a melting point of 256°–258° (dec.).

Example 26.—Preparation of 4-(1-benzylidenepropyl)pyridine hydrochloride 10.6 g. benzaldehyde, 12.1 g. 4-propylpyridine and 5 ml. acetic anhydride were heated at 150° for 40 hours. The cooled mixture was poured into 600 ml. water. The solution was neutralized and extracted with methylene chloride. After removal of the solvent, the residue was converted to the hydrochloride in the usual manner. After recrystallization from isopropanol, 4-(1-benzylidenepropyl)pyridine hydrochloride had a melting point of 200°–202° (dec.).

Example 27.—Preparation of 4-[α-(p-chlorobenzylidene)propyl]pyridine hydrochloride 14 g. p-chlorobenzaldehyde, 12.1 g. 4-propylpyridine and 5 ml. acetic anhydride were heated at 150° for 40 hours. The cooled mixture was poured into 800 ml. water. The solution was made alkaline and extracted with methylene chloride. After removal of the solvent, the residue was converted to the hydrochloride in the usual manner. After recrystallization from isopropanol, the crystals of 4-[α - (p-chlorobenzylidene)propyl]pyridine hydrochloride, had a melting point of 229°–231° (dec.).

Example 28.—Preparation of 4-[1-(p-nitrobenzylidene)propyl]pyridine hydrochloride 15.1 g. p-nitrobenzaldehyde, 12.1 g. 4-propylpyridine and 5 ml. acetice anhydride were heated at 155° for 40 hours. The cooled mixture was added to 600 ml. water. The supernatant liquid was decanted and the residue treated with ether. The solids were removed by filtration, dissolved in ethanol and converted to the hydrochloride in the usual manner. After recrystallization from isopropanol, the crystals of 4-[1-(p-nitrobenzylidene)propyl] pyridine hydrochloride had a melting point of 234°–236° (dec.).

Example 29.—Preparation of 1-(1-naphthyl)-2-(4-pyridyl)ethylene hydrochloride 7.8 g. 1-naphthaldehyde, 4.6 g. 4-picoline and 2.5 ml. acetic anhydride were heated at 150–160° for 40 hours. The cooled mixture was added to 600 ml. water, made alkaline and extracted with methylene chloride. After removal of the solvent, the residue was converted to the hydrochloride in the usual manner. The crystals of 1-(1-naphthyl)-2-(4-pyridyl)ethylene hydrochloride, obtained after recrystallization from isopropanol had a melting point of 277°–279° (dec.).

Example 30.—Preparation of 1-(3-methyl-4-pyridyl)-2-(1-naphthyl)ethylene hydrochloride 7.8 g. 1-naphthaldehyde, 5.4 g. 3,4-lutidine and 2.5 ml. acetic anhydride were heated at 150–160° for 40 hours.

The cooled mixture was added to 600 ml. water, made alkaline and extracted with methylene chloride. The residue obtained after removal of the solvent was dissolved in ethanol and converted to the hydrochloride in the usual manner. After recrystallization from isopropanol, the crystals of 1-(3-methyl-4-pyridyl)-2-(1-naphthyl)ethylene hydrochloride had a melting point of 254°–256° (dec.).

EXAMPLE 31

| Capsule formulation: | Per capsule (mg.) |
|---|---|
| 4-[β-(4-pyridyl)vinyl]benzenesulfonamide | 50 |
| Lactose, U.S.P. | 125 |
| Corn starch, U.S.P. | 30 |
| Talc, U.S.P. | 5 |
| Total weight | 210 |

50 parts of 4-[β-(4-pyridyl)vinyl]benzenesulfonamide are mixed with 125 parts of lactose and 30 parts of corn starch in a suitable mixer. The mixture is further blended by passing through a Fitzpatrick Comminuting Machine with a No. 1A screen with knives forward. The blended powder is returned to the mixer, 5 parts of talc added and blended thoroughly. The mixture is filled into No. 4 hard shell gelatin capsules on a Parke Davis capsulating machine.

EXAMPLE 32

| Tablet formulation: | Per tablet (mg.) |
|---|---|
| 4-[β-(4-pyridyl)vinyl]benzenesulfonamide (2 percent excess) | 255 |
| Dicalcium phosphate dihydrate, unmilled | 230 |
| Corn starch | 70 |
| FD and C Yellow No. 5—Aluminum Lake 25 percent | 2 |
| Durkee 117 [a] | 25 |
| Calcium stearate | 3 |
| Total weight | 585 |

[a] Mixture of di- and tri-glycerides, Durkee Famous Food—Division of Glidden, Jamaica, N.Y.

All the ingredients are mixed thoroughly in a Fitzpatrick machine (Model D) using a No. 1A screen, medium speed. The mixture is remixed and slugged. The slugs are screened on an Oscillator through a No. 14 mesh screen and compressed on an "E" machine.

I claim:
1. A compound of the formula

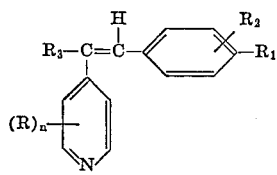

wherein R is hydrogen or lower alkyl;
$R_1$ is sulfamoyl, lower alkanoylsulfamoyl, lower alkanoylamido or benzoylamido;
$R_2$ is hydrogen or halogen;
$R_3$ is hydrogen or alkyl; and
$n$ is 1 to 2, and their pharmaceutically acceptable acid addition salts.

2. A compound in accordance with claim 1 wherein $R_2$ is hydrogen.

3. A compound in accordance with claim 2 wherein $R_1$ is sulfamoyl.

4. A compound in accordance with claim 3 wherein $R_3$ is hydrogen.

5. A compound in accordance with claim 4 wherein R is lower alkyl and $n$ is 1.

6. A compound in accordance with claim 3 wherein $R_3$ is lower alkyl.

7. A compound in accordance with claim 6 wherein R is hydrogen.

8. A compound of the formula

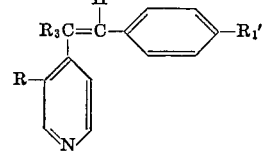

wherein R is hydrogen or lower alkyl;
$R_1'$ is sulfamoyl or lower alkanoylsulfamoyl;
$R_3$ is hydrogen or lower alkyl.

and their pharmaceutically acceptable acid addition salts.

9. A compound in accordance with claim 8 wherein $R_1'$ is sulfamoyl.

10. A compound in accordance with claim 9 wherein R and $R_3$ are hydrogen, i.e., 4-[β-(4-pyridyl)vinyl]benzenesulfonamide.

11. The compound in accordance with claim 9 wherein R is hydrogen and $R_3$ is methyl, i.e., 4-[2-(4-pyridyl)propenyl]-benzenesulfonamide.

12. A compound in accordance with claim 9 wherein R is hydrogen and $R_3$ is ethyl, i.e., 4-[2-(4-pyridyl)-1-buten-1-yl]-benzenesulfonamide.

References Cited

UNITED STATES PATENTS

| 2,616,890 | 11/1952 | Smith | 260—240 |

FOREIGN PATENTS

| 834,929 | 5/1960 | Great Britain | 260—294.8 |

OTHER REFERENCES

Baumert: Ber. Deut. Chem. vol. 39, pp. 2971 to 2972 (1906).

Index Chemicus, vol. 27, No. 87,801 (Dec. 4, 1967).

Beilstein's Handbuch der Organischen Chemie, 4th Ed. vol. 22, system No. 3398, p. 461 (1935).

Chemical Abstracts I, vol. 52, col. 12866 (1958) (abstract of Parker et al.).

Chemical Abstracts II, vol. 54, col. 25291 (1960) (abstract of Bahner).

JOHN D. RANDOLPH, Primary Examiner

U.S. Cl. X.R.
260—240.9; 424—263